No. 789,556. PATENTED MAY 9, 1905.
G. C. MARX.
ELECTRIC SWITCH.
APPLICATION FILED SEPT. 1, 1904.
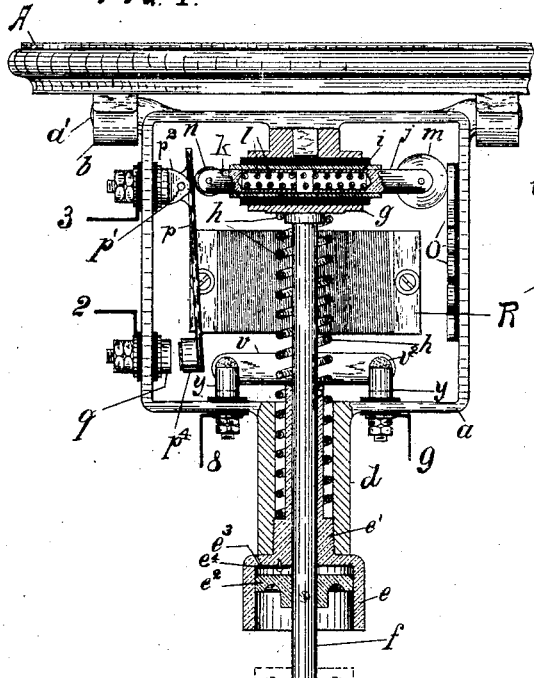
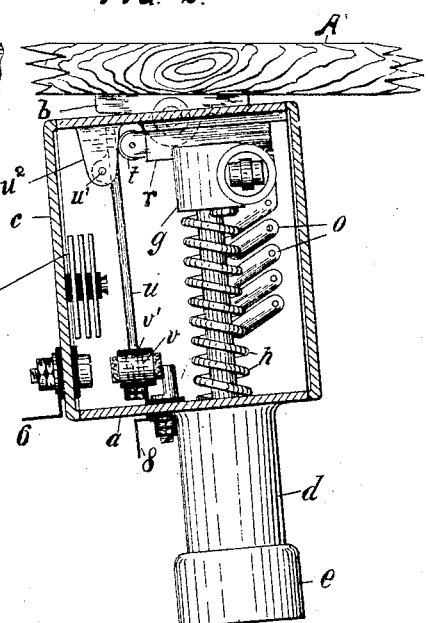
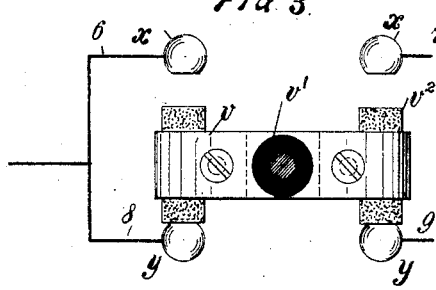
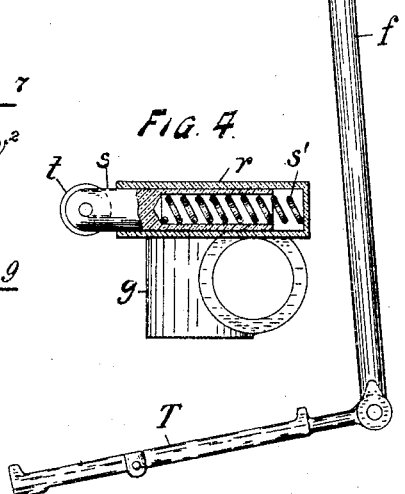
WITNESSES:
INVENTOR
Gustav C. Marx,
BY
Henry J. Miller,
his ATTORNEY No. 789,556. Patented May 9, 1905.

UNITED STATES PATENT OFFICE.

GUSTAVE C. MARX, OF ELIZABETH, NEW JERSEY, ASSIGNOR TO DIEHL MANUFACTURING COMPANY, A CORPORATION OF NEW JERSEY.

ELECTRIC SWITCH.

SPECIFICATION forming part of Letters Patent No. 789,556, dated May 9, 1905.

Application filed September 1, 1904. Serial No. 222,935.

*To all whom it may concern:*

Be it known that I, GUSTAVE C. MARX, a citizen of the United States, residing at Elizabeth, in the county of Union and State of New Jersey, have invented certain new and useful Improvements in Electric Switches, of which the following is a specification, reference being had therein to the accompanying drawings.

This invention relates to an improvement in switches for controlling the operation of electric motors in which the armature is adapted to be disconnected from the main circuit and short-circuited, so that while the field remains excited the armature, continuing to rotate under its momentum, generates a current which under the influence of the short circuit imposes an excessive load upon the armature, and thus serves as a brake to arrest the rotation of the latter.

The invention has for its object to provide a switch for such purpose which shall be simple in construction and effective in operation and shall require only a single actuation to produce the results above described.

The invention consists primarily in the combination of a circuit-changing member for interrupting the connection of the motor-armature with the main circuit and establishing an independent circuit therefor, a circuit-interrupting member for interrupting the remaining connection between the main circuit and the motor, and a common actuating device for operating first the circuit-changing member and then the circuit-interrupting member, whereby the motor may be subjected to the braking action of the current generated in the short circuit before its connection with the main circuit is finally severed.

The invention also includes certain details of construction of such a device and other matters, which will be hereinafter described.

In the drawings annexed, Figure 1 is a front elevation of a switch-box with a portion of a sewing-machine table to which it is hinged, the box having the cover-plate removed and being partly in section. Fig. 2 is a side elevation of the same with the box or casing partly in section and represented as having its operating-rod connected by a pivotal joint with a sewing-machine treadle-plate. Fig. 3 is a plan of one of the switch members with the contact-studs which it serves to connect; and Fig. 4 is a detail view, partly in section, of a spring-pressed controlling-plug for one of the switch members.

As shown herein, the box or casing $a$ is provided at the upper side with two pintles $a'$, entering suitable apertures in the bearings $b$, secured to the bottom of the sewing-machine table A, and is provided upon the front side with a cover-plate $c$ and upon its lower side with a hollow cylindrical socket $d$, terminating at the lower end in a short dash-pot cylinder $e$. The inner end of the cylinder $e$ is formed with a hollow boss $e'$, constituting a bushing to which is fitted the reciprocating operating-rod $f$, carrying at its upper or inner end a head $g$, between which and a shoulder of the boss $e'$ is interposed a spring $h$, surrounding the rod $f$ and tending to press the head $g$ upward into its initial position.

The head $g$ is provided with an insulating-bushing containing the sleeve $i$, to which is fitted two plugs $j$ and $k$, recessed in their adjacent ends to receive the interposed spring $l$, and each of said plugs is forked at its outer end to receive an antifriction-roller $m$ and $n$, respectively. The roller $m$ rolls permanently in contact with one or more of the contact-plates $o$, connected in a manner well known with the several sections of the resistance R, while the roller $n$ rolls permanently in contact with the switch-lever $p$, pivoted at $p'$ to a fixed insulated forked stud $p^2$, the other end of such lever having a stud $p^4$, adapted to make contact with the insulated stud $q$.

The head $g$ carries also a tubular socket $r$, to which is fitted the bearing-block $s$, recessed in its inner end to receive the spring $s'$ and carrying the antifriction-roller $t$. Under the action of the spring $s'$ the roller $t$ is in permanent contact with the switch-lever $u$, which is pivoted at $u'$ upon the forked lug $u^2$, depending from the top of the casing, and carries at its opposite end a pivoted cross-bar $v$, insulated therefrom in the usual manner by means of the insulated washers $v'$ and intermediate bushing, the cross-bar $v$ carrying at its opposite ends the carbon contact-plugs $v^2$, adapted to connect alternately the insulated contact-studs of each pair $x$ and $y$, respectively.

The operating-rod $f$ is provided near the dash-pot cylinder $e$ with a piston $e^2$, adapted to enter the cylinder $e$ as the rod nears the end of its stroke at its highest position, and thereby operates to retard the final movement of the latter, the cylinder $e$ being provided with the usual air-inlet passage $e^3$ and flap-valve $e^4$ for closing the same. The operating-rod $f$ may be reciprocated by any convenient means, but is herein shown attached by a suitable pivotal pin to the sewing-machine treadle T.

The contact-studs $p^2$ and $q$ are connected, respectively, with the field-circuit wire 2 and main-circuit wire 3, the contact-studs $x$ being connected, respectively, with the wires 6 and 7 of the main armature-circuit, while the contact-studs $y$ are connected, respectively, with the independent armature-circuit wires 8 and 9. The contact-plates $o$ of the rheostat are connected with their respective coils of the resistance R, as already described.

In the operation of the device the tilting of the treadle serves to draw the head $g$ downwardly in opposition to the spring $h$, and thereby causes the roller $n$ to simultaneously pass over the pivotal pin $p'$ of the primary or circuit-interrupting switch-lever $p$ to tilt the latter from its initial open position, and thereby to close the circuit 2 3 through the field-magnets of the motor, at the same time causing the roller $t$ to pass over the pivotal pin $u'$ of the circuit-changing lever $u$ to tilt the latter from initial position, wherein this member establishes connection between the contact-studs $x$, and thereby closes the connection of the armature with the main circuit. The further inclination of the treadle T, with the resultant continued downward motion of the rod $f$, serves to gradually cut out the resistances from the main armature-circuit to increase the speed of the motor up to the maximum.

When it is desired to stop the motor, the release of the treadle T by the operator permits the operating-rod $f$ to move upwardly under the action of the spring $h$ to first throw in the full resistance of the rheostat, then actuate the circuit-changing switch-lever $u$ to short-circuit the motor, and finally after the action of the dash-pot $e\ e^2$ in retarding the final motion of the rod $f$, and consequently the roller $n$, to cause the opening of the main circuit by the throwing over the circuit-interrupting lever $p$.

As will be seen by reference to Figs. 1 and 2, the pivotal pins $u'$ and $p'$ of the circuit-changing and circuit-interrupting levers $u$ and $p$ are so disposed in relation to the initial positions of the contact-rollers $t$ and $n$, respectively, that under the action of the spring $h$ upon the head $g$, carrying such rollers, the lever $u$ is tilted into initial position prior to the lever $p$, while the dash-pot piston $e^2$ is so disposed upon the rod $f$ in relation to the dash-pot cylinder $e$ that its action takes place principally just after the shifting of the lever $u$ and just prior to the final movement of the lever $p$. The retardation of the dash-pot upon the rod $f$ may be readily adjusted to give sufficient time for the stoppage of the motor under the braking action of the current generated in the independent armature-circuit before the main circuit 2 3, through the switch-lever $p$, is finally opened to wholly interrupt the flow of current through the motor.

As the contact-plug $v^2$ of the cross-bar $v$, carried by the swinging lever $u$, is designed to connect the four contact-studs $x\ x\ y\ y$ in pairs, it is necessary that means should be provided to enable it to adjust itself to the individual members of each pair, and by mounting it at the lower end of the lever $u$ in such manner as to enable it to swing under the pressure of the lever intermediate the plugs $v^2$ this end is effectively attained.

It is evident that the present improvement is susceptible of wide variation in features of construction and arrangement without departure from the present invention, and it is therefore to be understood that the present improvement includes all mechanical equivalents of the devices herein shown and described.

Having thus set forth the nature of my invention, what I claim herein is—

1. In an electric switch, the combination with a circuit-changing and a circuit-interrupting member, of a common actuating device for operating the same successively, and means for retarding the action of the said actuating device intermediate its actuations of said members.

2. In an electric switch, the combination with a circuit-changing and a circuit-interrupting member, of a common spring-actuated device for operating the same successively, and pneumatically-controlled means for retarding the action of said actuating device intermediate its actuations of said members.

3. In an electric switch, the combination with a circuit-changing and a circuit-interrupting member, of a common spring-actuated device for operating the same, and means for retarding the continued action of said operating device intermediate its operations upon said members.

4. A switch-box containing two vibrating switch-levers and a reciprocating operating-rod provided with contact plugs or projections adapted to move longitudinally of and in permanent engagement with said levers and to produce the successive actuation of the same by passing over their points of support.

5. A switch-box containing two vibrating switch-levers and a reciprocating operating-rod provided with contact plugs or projections adapted to move longitudinally of and in permanent engagement with said levers, a spring applied to said actuating-rod for forcing it from a position with said projections at one side of to an extreme position with said projections beyond the points of support of said levers, and means for retarding the movement of said rod under the action of its spring intermediate the actuations of the said levers.

6. A switch-box containing at opposite sides a series of resistance contact-plates and a vibrating switch-lever mounted upon a pivot intermediate its ends, an operating-rod movable longitudinally of said vibrating lever, two contact-plugs carried by said operating-rod with an interposed spring to maintain them in permanent contact respectively with said contact-plates and switch-lever, and means for actuating said rod to move the respective contact-plug across the pivoted portion of said lever.

7. A switch-box containing at opposite sides a series of resistance contact-plates and a vibrating switch-lever mounted upon a pivot intermediate its ends, an operating-rod movable longitudinally of said vibrating lever, two contact-plugs carried by said operating-rod with an interposed spring to maintain them in permanent contact respectively with said contact-plates and switch-lever, a second pivoted switch-lever constructed to connect a series of contact-studs alternately in pairs, a spring-actuated contact-plug carried by said operating-rod maintained by its spring in permanent contact with said pivoted switch-lever, and means for actuating said operating-rod to move the respective contact-plugs across the pivoted portions of said levers.

8. A switch-box containing a plurality of vibrating switch-levers, and a common operating-rod movable longitudinally of said levers and carrying a plurality of contact-plugs each adapted to be pressed permanently against one of said levers and to pass over the point of suspension of the same at a different time from another or others of said levers to cause the successive throw of the latter.

9. In a switch-box, the combination with a vibrating switch-lever and means for operating it, a plurality of contact-points arranged in pairs, and an insulated cross-bar pivotally mounted upon and carried by said switch-lever and adapted to form an electrical connection alternately between the contact-points of each pair.

10. The combination with a table or support, of a switch-box pivotally attached thereto and containing a plurality of contact-points and switch-levers for connecting the same, a common reciprocating operating-rod for successively actuating said switch-levers, and a treadle with which said operating-rod is connected.

11. The combination with a table or support, of a switch-box pivotally attached thereto and containing a plurality of contact-points and switch-levers for connecting the same, a dash-pot cylinder carried by said switch-box, a common reciprocating operating-rod passing through said dash-pot cylinder for successively actuating said switch-levers, a piston carried by said operating-rod and fitted to said dash-pot cylinder, a spring for normally pressing said operating-rod into initial position with its piston in the inner end of said cylinder, and a treadle for moving said operating-rod in opposition to said spring.

12. The combination with a table or support, of a switch-box pivotally attached thereto and containing a plurality of contact-points and switch-levers for connecting the same, a dash-pot cylinder carried by said switch-box and provided with an axially-disposed hollow boss or sleeve, a common reciprocating operating-rod passing through said dash-pot cylinder and hollow boss or sleeve and guided by the latter for successively actuating said switch-levers, a piston carried by said operating-rod and fitted to said dash-pot cylinder, a spring for normally pressing said operating-rod into initial position with its piston in the inner end of said cylinder, and a treadle for moving said operating-rod in opposition to said spring.

13. The combination with a table or support, of a switch-box attached thereto and provided with a dash-pot cylinder provided in its closed inner end with an inwardly-opening valve, a plurality of contact-points and switch-levers for connecting the same contained within said switch-box, a common reciprocating operating-rod entering said switch-box through the dash-pot cylinder for successively actuating said switch-levers, a piston attached to said operating-rod and adapted to enter said cylinder, and means for actuating said operating-rod.

14. In an electric switch, the combination with a circuit-changing and a circuit-interrupting member, each comprising a swinging contact part, of a common actuating device movable independently of said contact parts and adapted to shift the same successively, and means for retarding the action of the said actuating device intermediate its actuations of said parts.

In testimony whereof I have signed my name to this specification in the presence of two subscribing witnesses.

GUSTAVE C. MARX.

Witnesses:
EUGENE H. DUERR,
HENRY J. MILLER.